United States Patent [19]

Saito

[11] 4,441,588

[45] Apr. 10, 1984

[54] DISC BRAKE INCLUDING A SPRING FOR PRESSING A FRICTION PAD AGAINST A GUIDING PORTION

[75] Inventor: Kazuo Saito, Kanagawa, Japan

[73] Assignee: Tokico Ltd., Kawasaki, Japan

[21] Appl. No.: 316,425

[22] Filed: Oct. 29, 1981

[30] Foreign Application Priority Data

Nov. 1, 1980 [JP] Japan .................. 55/154349

[51] Int. Cl.³ ............................................ F16D 65/40
[52] U.S. Cl. ............................... 188/73.38; 188/73.45
[58] Field of Search .............. 188/73.36, 73.37, 73.38, 188/73.39, 73.44, 73.45, 205 A, 72.4

[56] References Cited

U.S. PATENT DOCUMENTS

| | | | |
|---|---|---|---|
| 3,977,498 | 8/1976 | Ogawa | 188/73.45 |
| 4,061,209 | 12/1977 | Gee et al. | 188/73.36 |
| 4,222,465 | 9/1980 | Haraikawa et al. | 188/73.45 |
| 4,245,723 | 1/1981 | Moriya | 188/73.38 |

FOREIGN PATENT DOCUMENTS

| | | | |
|---|---|---|---|
| 1575945 | 1/1970 | Fed. Rep. of Germany | 188/73.36 |
| 1967110 | 10/1977 | Fed. Rep. of Germany | 188/73.38 |
| 52-9770 | 1/1977 | Japan | 188/73.38 |
| 55-109836 | 8/1980 | Japan | 188/73.38 |
| 1381589 | 1/1975 | United Kingdom | 188/73.38 |
| 2056601 | 3/1981 | United Kingdom | 188/73.36 |
| 2071238 | 9/1981 | United Kingdom | 188/73.38 |

Primary Examiner—Douglas C. Butler
Assistant Examiner—R. R. Diefendorf
Attorney, Agent, or Firm—Wenderoth, Lind & Ponack

[57] ABSTRACT

A disc brake including a friction pad disposed on one surface of a rotatable disc and being slidably supported on a guiding portion. A pad spring presses the friction pad against the guiding portion in the direction radially inwards with respect to the axis of the disc and in one direction along the circumference of the disc.

12 Claims, 7 Drawing Figures

DISC BRAKE INCLUDING A SPRING FOR PRESSING A FRICTION PAD AGAINST A GUIDING PORTION

BACKGROUND OF THE INVENTION

This invention relates to a disc brake.

Conventional disc brakes comprise a pair of friction pads provided on opposite surfaces of a rotatable disc, and at least one friction pad is displaceably supported on a guiding portion so as to displace toward and away relative to a surface of the disc in applying or releasing the brake, i.e., to displace in the direction of the axis of the disc. Usually, a pad spring is provided to bias the friction pad against the guiding portion, and the biasing force of the pad spring is perpendicular to the axis of the disc and is usually directed to the axis of the disc or in the direction of the radius of the disc.

However, a disc brake for use in such as a two-wheeled vehicle (e.g., a front fork of a motor-cycle) is usually moiunted at an inclined attitude, the vibrations acting in the direction perpendicular to the surface of the ground sometime vibrate the friction pad in the direction of the circumference. In such case the pad spring cannot effectively suppress the vibrations since the spring force of the pad spring is generally perpendicular to the direction of the circumference of the disc. The pad guiding portion will excessively wear thereby generating noisy sounds or will pittingly corrode, thereby impeding smooth displacement of the friction pad.

SUMMARY OF THE INVENTION

An object of the present invention is to overcome the shortcomings aforementioned by providing a disc brake having a pad spring which is adapted to press a friction pad against a pad guiding portion and in the direction of the radius of the disc and in one direction along the circumference of the disc.

The pad guiding portion may be a pair of guide pins mounted on a stationary carrier, or may be a pair of shoulders provided on a stationary carrier and spaced in the direction of the circumference of the disc.

BRIEF DESCRIPTION OF THE DRAWINGS

The invention will hereinafter be explained in detail with reference to accompanying drawings which exemplify some preferred embodiments of the invention, in which.

DETAILED DESCRIPTION OF THE PREFERRED EMBODIMENTS

Figure 4:
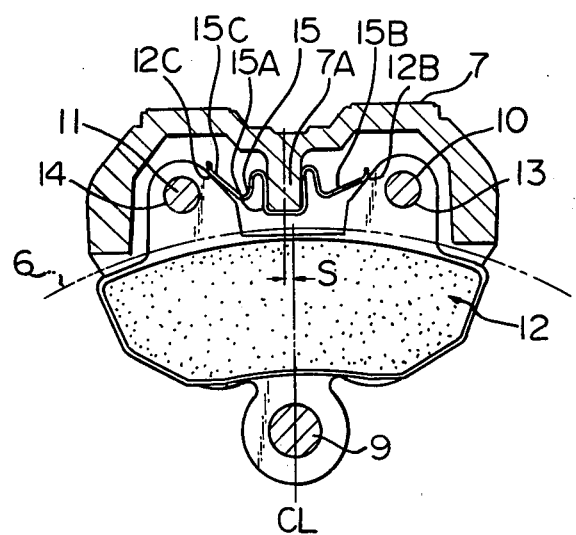
FIG. 4 is a partial sectional view taken along line IV—IV in FIG. 2.

FIGS. 1-5 show a disc brake according to the invention as applied for use in a motor-cycle. The disc brake comprises a stationary carrier 5 which is secured to a front fork 1 of the motor-cycle at one side of a disc 6 which rotates together with a wheel (not shown). A caliper 7 is mounted on the carrier 5 through pins 8 and 9 to displace in the direction of the axis of the disc 6. A brake actuating mechanism such as a hydraulic cylinder and piston device known per se is provided on the caliper 7. A pair of friction pads 12 (only one of which is shown in FIG. 4 of the drawings) are disposed on opposite sides of the disc 6 and slidably supported on guide pins 10 and 11. The guide pins 10 and 11 act as pad guiding portions according to the invention and are removably mounted on the caliper 7 to extend in the direction of the axis of the disc 6. Since the two friction pads 12 are supported similarly on the guide pins 10 and 11, the description therefor will be made with respect to only one friction pad 12.

As shown in FIG. 4, the friction pad 12 is symmetrical with respect to the center line CL therefor and in the direction of the circumference of the disc 6, and has two circumferentially spaced bores 13 and 14, shown in FIG. 4, for slidably receiving therethrough the guide pins 10 and 11. It will be noted that the center line CL intersects the axis of the disc 6 and is equally spaced from bores 13 and 14.

Figure 5:
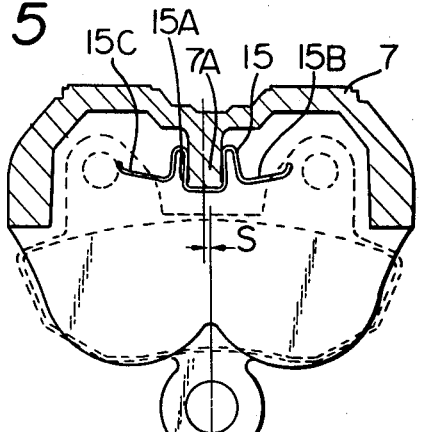
FIG. 5 is a view similar to FIG. 4 but the friction pad is removed.

A pad spring 15 is mounted on the caliper 7 and acts on the friction pad 12. The pad spring 15 presses the friction pad 12 in the direction of the radius of the disc (radially inward direction) and in one direction along the circumference of the disc (one circumferential direction), according to the invention. Namely, in FIG. 4, the pad spring 15 presses the friction pad 12 downwards and leftwards. Preferably, the one circumferential direction is the rotational direction of the disc 6 in the normal forward movement of the vehicle. As shown in FIG. 4, there is provided on the inner wall of the caliper 7 a pad mounting portion 7A which is displaced leftward by a predetermined distance S from the center line CL of the friction pad 12. The pad spring 15 is formed of a resilient material and comprises a clamping portion 15A in the central portion to clampingly engage with the mounting portion 7A of the caliper 7, and leg portions 15B and 15C. The leg portion 15C extends leftwards from the clamping portion 15A and the leg portion 15B extends rightwards. Preferably, the leg portions 15B and 15C are symmetrical as shown in FIG. 5. In the embodiment, the leg portions 15B and 15C have substantial width in the direction of the axis of the disc 6 (vertically to the papers of FIG. 5) so as to press both friction pads 12 respectively. However, when the brake actuating mechanism is provided on only one side of the disc 6, one of the friction pads 12 may removably be secured to the caliper 7 and, in such case, the pad spring 15 may be modified to act on the other friction pad 12 only.

On the upper surface of the friction pad 2, there are provided two inclined surface portions 12B and 12C for abutting respectively with the leg portions 15B and 15C of the pad spring 15. The inclined surface portions 12B and 12C act as abutting surface portions according to the invention and, are symmetrical with respect to the center line CL.

With the engagement between the leg portion 15C and the inclined surface portion 12C, the friction pad 12 receives the pressing forces in the radially inward direction and the circumferentially leftward direction, and with the engagement between the leg portion 15B and the inclined surface portion 12B, the pressing forces in the radially inward direction and in the circumferentially rightward direction act on the friction pad 12. As clearly as can be understood in comparing FIGS. 4 and 5, the leg portion 15C is more deflected than the leg portion 15B, the circumferentially leftward pressing force is larger than the circumferentially rightward pressing force, thus, the friction pad 12 receives a circumferentially leftward pressing force.

When the brake is applied in the normal forward movement of the vehicle, one friction pad 12 is displaced by the brake actuating mechanism to tightly engage with one surface of the disc 6, and the reaction force thereof displaces the caliper 7 along the pins 8 and 9 so that the other friction pad 12 tightly engages with the other surface of the disc 6. At that time the friction pad 12 is normally pressed by the pad spring 15 in the rotational direction of the disc 6; thus, it is possible to prevent the rattling movement of the friction pad 12 in the direction of the circumference of the disc 6.

Figure 1:
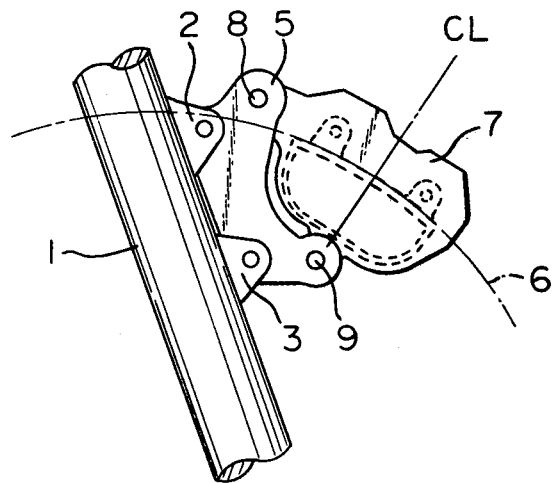
FIG. 1 is a schematic side view of a disc brake according to a first embodiment of the invention.
Figure 2:
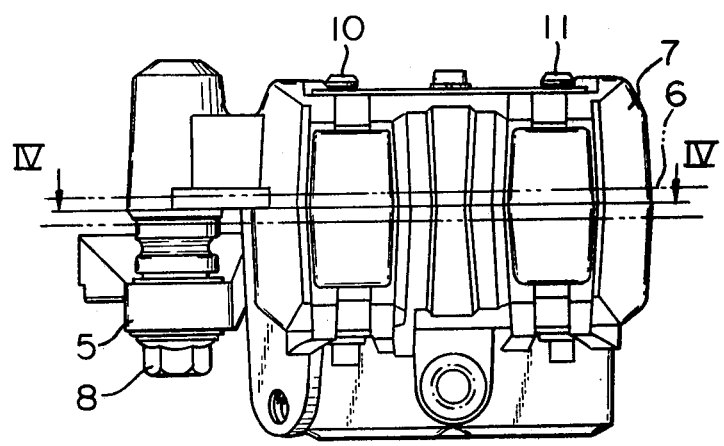
FIG. 2 is a top view of the disc brake of FIG. 1.
Figure 3:
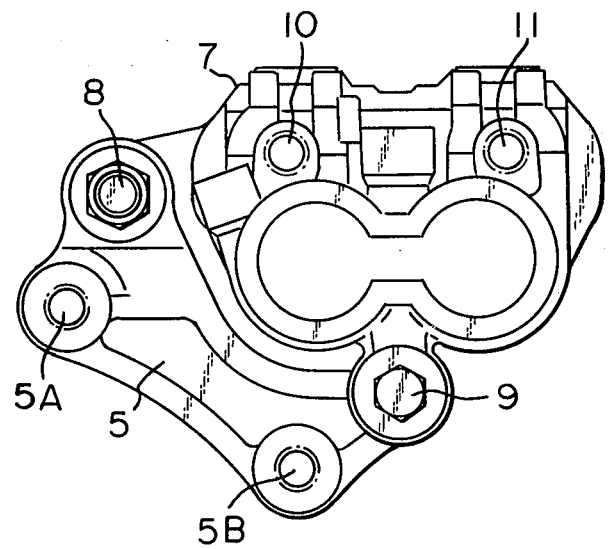
FIG. 3 is a side view of the disc brake of FIG. 2.

When the disc brake is mounted on the vehicle in a posture as shown in FIG. 1, the disc brake receives the vibrations in the vertical direction, having components both in the radial direction and the circumferential direction. However, the pad spring 15 according to the invention effectively presses the friction pad 12 both in the radial direction and the circumferential direction; thus, it is possible to suppress the vibrations of the friction pad 12.

Figure 6:
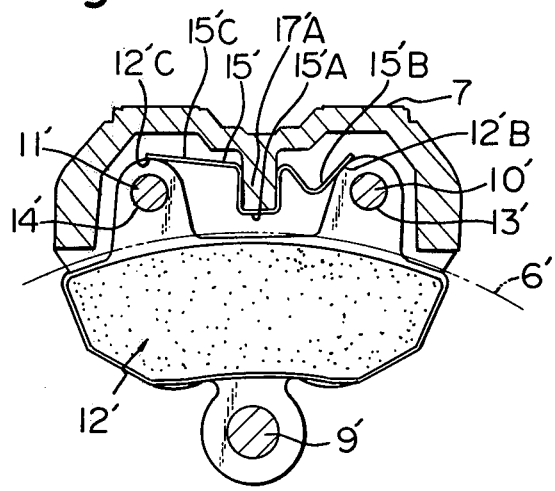
FIG. 6 is a view similar to FIG. 4 but showing a second embodiment of the invention.

FIG. 6 shows a second embodiment of the invention and corresponds to FIG. 4, and parts corresponding to the first embodiment are denoted by the same reference numerals having the prime thereon. The friction pad 12' has arcuate surfaces 12'B and 12'C acting as abutting surface portions. The arcuate surfaces 12'B and 12'C are symmetical with respect to the center line of the friction pad 12'. Two leg portions 15'B and 15'C are unsymmetrical with respect to the center line of the clamping portion 15'A. Further, the mounting portion 17'A is radially aligned with the center line of the friction pad 12'. The leg portions 15'B and 15'C abut respectively with unsymmetrical positions of the arcuate surface portions 12B' and 12C' so that the circumferential components of pressing forces of the leg portions 15'B and 15'C differ with one another. As the result, the friction pad 12' receives the pressing force in the radially inward direction and circumferentially rightward direction.

The present invention is not limited to the embodiments and may include the following modifications.

(a) The configuration of the pad spring may be modified as desired. For example, one of two leg portions of the pad spring presses the friction pad in the radially inward direction and the other leg portion of the pad spring presses the friction pad in the radially inward direction and one circumferential direction. Alternately, one leg portion of the pad spring presses in the radially inward direction and the other leg portion of the pad spring presses the friction pad in one circumferential direction.

Further, the pad spring may have a single leg portion which engages with the friction pad to press it in the radially inward direction and also in one circumferential direction.

Figure 7:
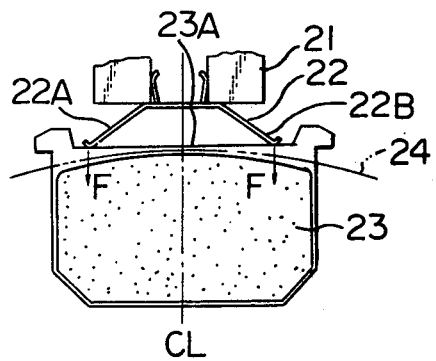
FIG. 7 is a view similar to FIG. 4 but showing a prior art disc brake.

(b) The guiding portion may not necessarily be a pair of pins mounted on the caliper, but may be a pair of shoulders provided respectively on a pair of circumferentially spaced arms of the stationary carrier. In such case, the friction pad may have a pair of circumferentially projecting lugs as shown in FIG. 7. The shoulders may be provided on the caliper.

(c) The disc brake of the invention is also applicable to four wheeled vehicles.

As described heretofore in detail, according to the invention, the friction pad is biased by the pad spring in the radially inward direction and in one circumferential direction; thus, irrespective of the posture of the friction pad mounted on a vehicle, the pad spring effectively suppresses vibrations of the friction pad, and prevents incidental movement of the friction pad, thereby preventing noisy sounds and excessive wear.

What is claimed is:

1. A disc brake comprising:
   a rotatable disc,
   a guiding portion extended in the direction of the axis of the disc,
   a friction pad disposed on one side of the rotatable disc and being supported on the guiding portion and being displaceable relative thereto in the direction of the axis of the disc,
   a pad spring provided to press the friction pad against the guiding portion in the direction of the radius of the disc and in one direction along the circumference of the disc,
   wherein the pad spring has two leg portions which respectively abut with abutting surface portions of the friction pad, with one leg portion pressing the friction pad in the direction of the radius of the disc and in one circumferential direction, and the other leg portion pressing the friction pad in the direction of the radius of the disc and in the other circumferential direction, and the pressing force in said one circumferential direction is larger than that in the other circumferential direction, and
   wherein said abutting surface portions are provided on two inclined surfaces which are symmetrical with respect to the circumferential center line of the friction pad, said two leg portions are symmetrical with respect to the circumferential center line of the pad spring, and the center line of the pad spring is displaced from the center line of the friction pad in the direction of the circumference of the disc.

2. A disc brake according to claim 1, further comprising a carrier adapted to be secured to a non-rotatable part of a vehicle, and a caliper mounted on the carrier and being displaceable relative thereto in the direction of the axis of the disc, said pad spring being mounted on the caliper.

3. A disc brake according to claim 2, wherein said guiding portion is a pair of guide pins mounted on the caliper.

4. A disc brake according to claim 2, wherein said guiding portion is provided on the carrier.

5. A disc brake comprising:
   a rotatable disc,
   a guiding portion extended in the direction of the axis of the disc,
   a friction pad disposed on one side of the rotatable disc and being supported on the guiding portion and being displaceable relative thereto in the direction of the axis of the disc,
   a pad spring provided to press the friction pad against the guiding portion in the direction of the radius of the disc and in one direction along the circumference of the disc, wherein the pad spring has two leg portions which respectively abut with abutting surface portions of the friction pad, with one leg portion pressing the friction pad in the direction of the radius of the disc and in one circumferential direction, and the other leg portion pressing the friction pad in the direction of the radius of the disc and in the other circumferential direction, and the pressing force in said one circumferential direction is larger than that in the other circumferential direction, and wherein said two leg portions are symmetrical with respect to the circumferential center line of the pad spring, and said two abutting surface portions are provided on two inclined surfaces with the inclination thereof with respect to the circumferential center line of the friction pad being different from each other.

6. A disc brake according to claim 5, further comprising a carrier adapted to be secured to a non-rotatable part of a vehicle, and a caliper mounted on the carrier and being displaceable relative thereto in the direction of the axis of the disc, said pad spring being mounted on the caliper.

7. A disc brake according to claim 6, wherein said guiding portion is a pair of guide pins mounted on the caliper.

8. A disc brake according to claim 6, wherein said guiding portion is provided on the carrier.

9. A disc brake comprising:
a rotatable disc,
a guiding portion extended in the direction of the axis of the disc,
a friction pad disposed on one side of the rotatable disc and being supported on the guiding portion and being displaceable relative thereto in the direction of the axis of the disc,
a pad spring provided to press the friction pad against the guiding portion in the direction of the radius of the disc and in one direction along the circumference of the disc,
wherein the pad spring has two leg portions which respectively abut with abutting surface portions of the friction pad, with one leg portion pressing the friction pad in the direction of the radius of the disc and in one circumferential direction, and the other leg portion pressing the friction pad in the direction of the radius of the disc and in the other circumferential direction, and the pressing force in said one circumferential direction is larger than that in the other circumferential direction,
wherein said two abutting surface portions are provided on arcuate surfaces which are symmetrically formed on the friction pad with respect to the circumferential center line thereof, and said two leg portions abut with the abutting surface portions unsymmetrically.

10. A disc brake according to claim 9, further comprising a carrier adapted to be secured to a non-rotatable part of a vehicle, and a caliper mounted on the carrier and being displaceable relative thereto in the direction of the axis of the disc, said pad spring being mounted on the caliper.

11. A disc brake according to claim 10, wherein said guiding portion is a pair of guide pins mounted on the caliper.

12. A disc brake according to claim 10, wherein said guiding portion is provided on the carrier.

* * * * *